United States Patent
Li et al.

(10) Patent No.: US 8,965,396 B2
(45) Date of Patent: Feb. 24, 2015

(54) LOCATION SYSTEM, METHOD, SERVER AND TERMINAL

(75) Inventors: Hui Li, Shenzhen (CN); Liang Shan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 119 days.

(21) Appl. No.: 13/258,416

(22) PCT Filed: Mar. 24, 2010

(86) PCT No.: PCT/CN2010/071265
§ 371 (c)(1),
(2), (4) Date: Mar. 16, 2012

(87) PCT Pub. No.: WO2010/145247
PCT Pub. Date: Dec. 23, 2010

(65) Prior Publication Data
US 2012/0184293 A1 Jul. 19, 2012

(30) Foreign Application Priority Data
Sep. 24, 2009 (CN) .......................... 2009 1 0093508

(51) Int. Cl.
*H04W 24/00* (2009.01)
*H04W 4/20* (2009.01)
*H04W 4/02* (2009.01)
*H04W 80/08* (2009.01)

(52) U.S. Cl.
CPC *H04W 4/20* (2013.01); *H04W 4/02* (2013.01); *H04W 80/085* (2013.01)
USPC .................................. 455/456.1; 455/404.2

(58) Field of Classification Search
USPC .......... 455/404.1, 404.2, 456.1, 456.2, 456.3, 455/457
See application file for complete search history.

(56) References Cited

U.S. PATENT DOCUMENTS

| | | | |
|---|---|---|---|
| 2006/0246919 A1* | 11/2006 | Park et al. .................. | 455/456.1 |
| 2008/0126535 A1 | 5/2008 | Zhu | |
| 2008/0228654 A1 | 9/2008 | Edge | |
| 2008/0261619 A1* | 10/2008 | Hines et al. ................ | 455/456.1 |
| 2009/0143076 A1* | 6/2009 | Wachter et al. ............ | 455/456.1 |
| 2010/0316006 A1* | 12/2010 | Thomson et al. ............. | 370/329 |
| 2011/0004672 A1 | 1/2011 | Garcia-Martin | |
| 2011/0200022 A1 | 8/2011 | Annamalai | |
| 2012/0202447 A1* | 8/2012 | Edge et al. ................. | 455/404.2 |
| 2013/0324154 A1* | 12/2013 | Raghupathy et al. ...... | 455/456.1 |

FOREIGN PATENT DOCUMENTS

| | | |
|---|---|---|
| CN | 101115283 A | 1/2008 |
| CN | 101336555 A | 12/2008 |

(Continued)

OTHER PUBLICATIONS

International Search Report on international application No. PCT/CN2010/071265, mailed on Jun. 24, 2010.

(Continued)

*Primary Examiner* — Myron K Wyche
(74) *Attorney, Agent, or Firm* — Oppedahl Patent Law Firm LLC

(57) ABSTRACT

This document discusses a location system, method, server and terminal. A location information server provides a Secure User Plane for Location, SUPL, Enabled Terminal, SET, with location information regarding the SET in a form of reference; the SET provides a Secure User Plane for Location, SUPL, server with the location information reference regarding the SET via an SUPL message; the SUPL server obtains the location information regarding the SET from the location information server according to the location information reference transmitted by the SET.

33 Claims, 2 Drawing Sheets

(56) References Cited

FOREIGN PATENT DOCUMENTS

| | | | |
|---|---|---|---|
| EP | 2034793 | A1 | 3/2009 |
| WO | 2007086636 | A1 | 8/2007 |
| WO | 2008051929 | A2 | 5/2008 |
| WO | 2008066793 | A1 | 6/2008 |
| WO | 2009097870 | A1 | 8/2009 |
| WO | 2009142963 | A2 | 11/2009 |
| WO | 2008112819 | A2 | 5/2012 |

OTHER PUBLICATIONS

English Translation of the Written Opinion of the International Search Authority in international application No. PCT/CN2010/071265, mailed on Jun. 24, 2010.

Mobile Location Service Architecture Oct. 22, 2007.
Supplementary European Search Report in European application No. 10788643.4, mailed on Jan. 20, 2014.
China Mobile, Open Mobile Alliance, OMA-LOC-2009-0097R01-INP, SUPL 3.0 Use Cases, Apr. 20, 2009.
3rd Generation Partnership Project, Technical Specification Group Services and System Aspects, Extended support of IP Multimedia Subsystem (IMS) emergency sessions (Release 9), 3GPP TR 23.868 V9.0.0, Dec. 1, 2008.
Emergency Services Interconnection Forum, Location Acquisition and Location Parameter Conveyance for Internet Access Networks in Support of Emergency Services, ATIS-XXXXX, Feb. 15, 2007.
Dawson, Martin, The Internet location services model, Jan. 26, 2008.
China Mobile, Open Mobile Alliance, OMA-LOC-2009-0117R01-CR SUPL3.0 RD Requirement, Apr. 20, 2009.

* cited by examiner

LOCATION SYSTEM, METHOD, SERVER AND TERMINAL

TECHNICAL FIELD

This disclosure relates to the fields of mobile communication technology and internet, particularly relates to a location system, method, server and terminal enabling the convergence of mobile communication network and internet.

BACKGROUND

The location service is one of the characteristic mobile communication services, which has always been considered as a bright spot in the future mobile value-added service. Currently, the mobile location service has been opened by major mobile communication operators in such countries and zones as North America, Europe, Asia Pacific, Japan and Korea. The mobile location service is the most attractive service among the mobile value-added services, and is also one of the most complicated services in the industrial chain, in terms of the steps involved.

Location (LOC) is established in 2002 through combining the work of Location Interoperability Forum (LIF), location service in Wireless Application Protocol (WAP) forum and the related work of 3GPP R6 LCS stage3 by Open Mobile Architecture (OMA), with the purposes of establishing location service standards capable of interconnection and interworking; establishing specifications of mobile location services; ensuring end-to-end interoperability; gradually replacing the $3^{rd}$ Generation Partnership Project (3GPP) and 3GPP2 in the areas of roaming and Le interfacing, and becoming a main international specification formulator in respect of location services. In view of the above, the major work of OMA LOC group is to establish a user-plane based location technology in the mobile communication network, to enable the transmission of the related location parameters via an IP path in the control plane location technology of mobile communication network and thus to realize location.

The Internet Engineering Task Force (IETF) was established in 1986, with the main tasks of research & development and establishment of technical specifications related to internet. At present, IETF has become a large technical research organization in the world and has the top authority in the internet industry. Teams in respect of the application field have been established in the IETF. Therefore, the protocols and standards regarding the application field related to location are developed and studied by the corresponding team. In the IETF, one of the standards related to location is Location Configuration Protocol (LCP) developed by the Geographic Location/Privacy (GEOPRIV) team. Location information can be provided, based on the LCP, in a form of location information value, or in a form of location information reference. The LCP comprises: Hypertext Transfer Protocol (HTTP) Enabled Location Delivery (HELD) standard, Dynamic Host Configuration Protocol (DHCP), Link Layer Discovery Protocol (LLDP), etc. Among them, the HELD standard is a protocol working at the seventh layer of the open hierarchical structure of Open System Interconnection (OSI), mainly describing how to obtain Location Information through the Location Generator in the access network.

Two approaches of obtaining the location information are defined in the HELD standard, i.e., obtaining by value or by reference, wherein obtaining by value means a terminal can directly request for location information from a location generator, the value can be, for example, in the form of text, similar to a civil address format; obtaining by reference means that the terminal can request for a location information Universal Resource Identifier (URI), or any other valid location information URI such as SIP URI, HTTP, HTTPS or the like, from the location generator. Because the location information URI is routable globally, the location information can be obtained through accessing to the location information URI. The two approaches above are compatible, and can be provided by the same location generator.

The HELD standard is a protocol based on Extensible Markup Language (XML), which can be bound to any session layer protocol, especially the session layer protocol with the function of Multipurpose Internet Mail Extensions (MIME), wherein binding to HTTP is a basic requirement. Meanwhile, the HELD standard is an extensible protocol working at the application layer, independent of the session layer.

The OMA LOC group has established the location standard based on secure user plane, i.e. Secure User Plane for Location (SUPL); the IETF has established the LCP standards. The HELD standard is the most typical standard of the LCP standards, enabling the location information transmission by means of HTTP on internet.

The OMA LOC group has completed the establishment of the SUPL 1.0 standard, which has been widely deployed and applied in the market. At present, the OMA LOC group is working on the establishment of the SUPL 2.0 standard, which is close to an end. In the SUPL 2.0 standard, the location functions in SUPL 1.0 standard have been enhanced, for example, triggering type location is added, location in different access networks is supported, etc. Meanwhile, different Global Navigation Satellite Systems (GNSS) are supported.

At present, the OMA LOC group is working on the establishment of technical specification of SUPL 3.0, which is at the first stage, i.e. the requirement gathering stage. At the present requirement gathering stage, it has been proposed to introduce the LCP is standard produced by the IETF into the SUPL architecture; however, there is still no scheme to meet such a demand currently.

SUMMARY

Therefore, the purpose of the disclosure is to provide a location system, method, server and terminal, to enable the location with convergence of the LCP of IETF and the SUPL of OMA LOC group.

To solve the above technical problem, the technical scheme of the disclosure is realized as follows:

A location system, which comprises:

a location information server, configured to provide a Secure User Plane for Location Enabled Terminal (SET) with location information regarding the SET in a form of reference, and to provide a Secure User Plane for Location (SUPL) server with location information corresponding to the location information reference regarding the SET;

the SUPL server, configured to obtain the location information regarding the SET from the location information server, based on the location information reference transmitted by the SET.

The location information server may provide the SET with the location information regarding the SET in the form of reference, specifically by: returning, by the location information server, one or multiple location information references, or a location information reference list containing multiple location information references, to the SET.

The location system further comprises: the SET, configured to obtain the location information reference regarding the SET from the location information server or/and to use a location information reference existing in the SET, and to transmit the location information reference to the SUPL server.

The SET may transmit the location information reference to the SUPL server, specifically by: transmitting, by the SET, the one or multiple location information references, or the location information reference list containing the multiple location information references to the SUPL server.

The SUPL server may obtain the location information regarding the SET from the location information server, specifically by:

requesting, by the SUPL server, the location information from the location information server based on one location information reference, if the SUPL server only receives the one location information reference;

transmitting, by the SUPL server, multiple location information references to the location information server in batches, or transmitting the location information reference list to the location information server for once, if the SUPL server receives the multiple location information references or the location information reference list containing the multiple location information references.

The SUPL server may be further configured to return one piece of location information to the SET or to an SUPL agent client, if the SUPL server only receives the one location information reference;

the SUPL server may be further configured to return multiple pieces of location information or a location information list containing multiple pieces of location information, or an optimal location information value determined by the SUPL server among the multiple pieces of location information, to the SET or to the SUPL agent client, if the SUPL server receives the multiple location information references or the location information reference list containing the multiple location information references.

A location method, which comprises:

obtaining, by an SUPL server, a location information reference regarding an SET via an SUPL message.

The method further comprises:

obtaining location information regarding the SET based on the obtained location information reference after the location information reference is obtained.

The location information reference regarding the SET may be transmitted from the SET to the SUPL server via the SUPL message.

The method further comprises:

providing, by the SUPL server, the SET or an SUPL agent client with the location information after the location information is obtained.

Obtaining, by an SUPL server, a location information reference regarding an SET via an SUPL message may comprise: providing, by the location information server, the SET with the location information regarding the SET in a form of reference, and providing, by the SET, the SUPL server with the location information reference via the SUPL message;

obtaining location information corresponding to the location information reference regarding the SET based on the location information reference may comprise: obtaining, by the SUPL server, the location information corresponding to the location information reference regarding the SET from the location information server, based on the location information reference transmitted by the SET.

Providing, by the location information server, the SET with the location information regarding the SET in a form of reference may comprise: returning, by the location information server, one or multiple location information references, or a location information reference list containing multiple location information references, to the SET.

The method further comprises:

obtaining, by the SET, the location information reference from the location information server, and transmitting, by the SET, the location information reference to the SUPL server, before the location information regarding the SET is obtained.

Transmitting, by the SET, the location information reference to the SUPL server may comprise: transmitting, by the SET, the one or multiple location information references, or the location information reference list containing multiple location information references, to the SUPL server.

Obtaining, by the SUPL server, the location information regarding the SET from the location information server may comprise:

requesting, by the SUPL server, the location information from the location information server based on one location information reference, if the SUPL server only receives the one location information reference;

transmitting, by the SUPL server, multiple location information references to the location information server in batches, or transmitting the location information reference list to the location information server for once, if the SUPL server receives the multiple location information references or the location information reference list containing the multiple location information references.

The method further comprises:

returning, by the SUPL server, one piece of location information to the SET or to the SUPL agent client, if the SUPL server only receives the one location information reference;

returning, by the SUPL server, multiple pieces of location information or a location information list containing multiple pieces of location information, or an optimal location information value determined by the SUPL server among the multiple pieces of location information, to the SET or to the SUPL agent client, if the SUPL server receives the multiple location information references or the location information reference list containing the multiple location information references.

Obtaining, by the SUPL server, the location information regarding the SET from the location information server, based on the location information reference may comprise: obtaining, by the SUPL server, the location information regarding the SET from the location information server based on the location information reference for once or at predetermined intervals.

A location server, which comprises: a reference determining unit, configured to obtain a location information reference regarding an SET via an SUPL message.

The location server may further comprise: a location obtaining unit, configured to obtain location information regarding the SET based on the location information reference.

The location server may further comprise: a location providing unit, configured to provide the SET or an SUPL agent client with the location information regarding to the SET.

A location terminal, which comprises:

a reference obtaining unit, configured to obtain a location information reference; and/or a reference storing unit, configured to store or cache the location information reference;

a reference providing unit, configured to transmit the location information reference to an SUPL server via a SUPL message.

The reference obtaining unit may be specifically configured to obtain one or multiple location information references, or a location information reference list containing multiple location information references, from a location information server; and/or, the reference storing unit may be specifically configured to store or cache the one or multiple location information references, or the location information reference list containing the multiple location information references, obtained from the location information server.

The reference providing unit may be specifically configured to transmit one or multiple location information references, or a location information reference list containing multiple location information references to the SUPL server via the SUPL message.

The terminal further comprises: a location obtaining module, configured to receive location information regarding an SET transmitted from the SUPL server.

The location obtaining module may be specifically configured to receive one or multiple pieces of location information or a location information list containing multiple pieces of location information, or an optimal location information value determined by the SUPL server among the multiple pieces of location information returned by the SUPL server.

According to the scheme provided by the disclosure, after the location information server receives the location information request transmitted by the SET, it returns the location information reference to the SET; the SUPL server requests for the location information from the location information server based on the location information reference transmitted from the SET, and receives the location information corresponding to the location information reference regarding the SET provided by the location information server, enabling the convergence of a current mainstream location architecture based on the SUPL of the Open Mobile Architecture (OMA) Location (LOC) group and another mainstream location architecture based on the Location Configuration Protocol (LCP) of the Internet Engineering Task Force (IETF).

By means of the convergence architecture provided by the disclosure, the functions of charging, security and privacy can be performed easily at the SUPL server side, in other words, the LCP of IETF can utilize the related functions already defined in SUPL of the OMA LOC group. Meanwhile, through converging the IETF location function, the SUPL server is able to obtain the auxiliary data of Global Positioning System (GPS) according to the location information regarding the SET, and transmit it to the SET.

DETAILED DESCRIPTION

In this disclosure, after the location information server receives a location information request transmitted by the SET, it returns location information regarding the SET in a form of reference, i.e. a location information reference, to the SET; the SUPL server obtains location information corresponding to the location information reference regarding the SET from the location information server, based on the location information reference transmitted by the SET. When a request for locating the SET is initiated by the SET, the SET actively transmits the location information request; when a request for locating the SET is initiated by the network side, the SET transmits the location information request, upon a request for locating by the SUPL agent client at the network side.

Figure 1:
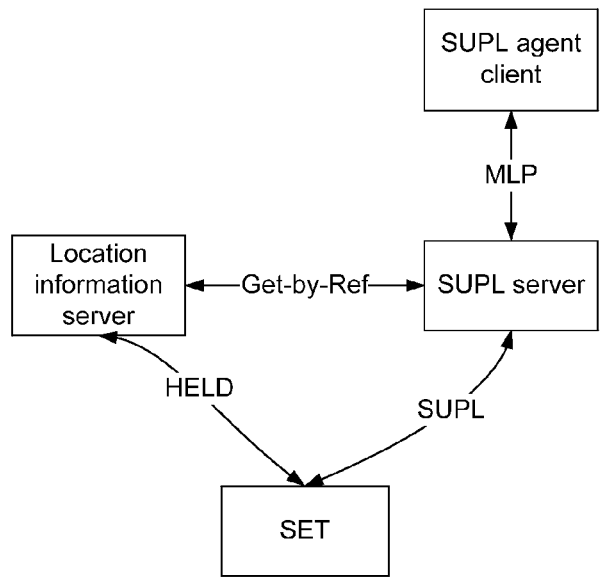
FIG. 1 shows a schematic view of the structure of the location system converging LCP and SUPL according to the disclosure.

FIG. 1 shows a schematic view of the structure of the location system converging the LCP and the SUPL according to the disclosure. As shown in FIG. 1, the location system comprises: an SET, a location information server, an SUPL server and an SUPL agent client, wherein the SET, i.e. an SUPL enabled terminal, may include the SUPL agent client, configured to obtain the location information regarding the SET provided in the form of reference, i.e. the location information reference, from the location information server, and transmitting the location information reference to the SUPL server; specifically, the SET is configured to transmit a location information request to the location information server, receive the location information reference returned by the location information server, and transmit the location information reference to the SUPL server;

the location information server, an entity for determining information related to the location of the SET, is configured to provide the SET with the location information of the SET in the form of reference, i.e. the location information reference, and provide the location information regarding the SET corresponding to the location information reference to the SUPL server; specifically, the location information server is configured to receive the location information request of the SET, return the location information of the SET in the form of reference, i.e. the location information reference, to the SET, receive the location information request transmitted from SUPL server, and provide the SUPL server with the location information corresponding to the location information reference regarding the SET;

the SUPL server, a location sever supporting the SUPL protocol, may provide the SUPL agent client with SUPL location function based on the SUPL protocol, and is configured to obtain the location information regarding the SET from the location information server based on the location information reference transmitted from the SET; specifically, the SUPL server is configured to receive the location information reference transmitted from the SET, request the location information from the location information server, and obtain the location information corresponding to the location information reference regarding the SET from the location information server.

The location information server is specifically configured to return one or multiple location information references, or a location information reference list containing multiple location information references, to the SET. Thus, when receiving one location information reference, the SET is specifically configured to transmit the one location information reference to the SUPL server; when receiving multiple location information references, or a location information reference list containing multiple location information references, the SET is specifically configured to transmit the multiple location information references, or the location information reference list containing multiple location information references to the SUPL server.

After the SUPL server receives the location information reference, based on the one location information reference, or multiple location information references, or location information reference list transmitted from the SET, it performs the following processes: if the SUPL server only receives one location information reference, the SUPL server is configured to request the location information from the location information server based on the one location information reference; if the SUPL server receives multiple location information references or a location information reference list containing multiple location information references, the SUPL server is configured to transmit the multiple location information references to location information server in batches, or transmit the location information references or the location information reference list to the location information server for once.

The SET is further configured to establish a session connection for SUPL location with the SUPL server.

When the request for locating the SET is initiated by the SET, the SUPL server is further configured to provide the location information regarding the SET to the SET; the SET is further configured to receive the location information regarding the SET from the SUPL server.

When the request for locating the SET is initiated by the network side, the location system further comprises: the SUPL agent client at the network side, configured to request for the location information regarding the SET from the SUPL server and receive the location information regarding the SET obtained in the form of reference by SUPL server from the location information server; the SUPL server is also configured to provide the SUPL agent client with the location information regarding the SET.

The SET is further configured to store or cache the obtained location information reference or location information reference list locally for future use by the SET directly.

If the SET only transmits one location information reference to the SUPL server, the SUPL server only returns one piece of location information to the SET or SUPL agent client; if the SET transmits multiple location information references or a location information reference list containing multiple location information references to the SUPL server, the SUPL server returns multiple pieces of location information or a location information list containing multiple pieces of location information to the SET or SUPL agent client, or the SUPL server determines an optimal location information value among the multiple pieces of location information, and then transmits the optimal value to the SET or SUPL agent client.

Actually, the SUPL agent client can be located either at the SET, or at the network side. The above description of the SUPL agent client at the network side is to distinguish it from an SUPL agent client at the SET. All the location information requests can be transmitted by the SUPL agent client. When the request for locating the SET is initiated by the SET, the location information request can be actively transmitted by the SUPL agent client at the SET; when the request for locating the SET is initiated by the network side, the request for locating can be transmitted by the SUPL agent client at the network side and the SUPL agent client at the SET transmits after the request for locating is transmitted.

The aforementioned SET and location information server interact as per the LCP standard of the IETF; the SET and the SUPL server interact as per the SUPL standard of the OMA LOC group; the interface between the SUPL server and the location information server is not limited in the specific implementations of the disclosure; the location information can be obtained as per the technology in the protocols related to the LCP, for example, when adopting the HELD standard, the interaction may be implemented by adoping the requesting/obtaining functions based on the HTTP; the SUPL server and the SUPL agent client at the network side interact as per the Mobile Location Protocol (MLP).

The aforementioned location information reference may be one location information reference, or may be multiple location information references, i.e. location information reference list.

Figure 2:
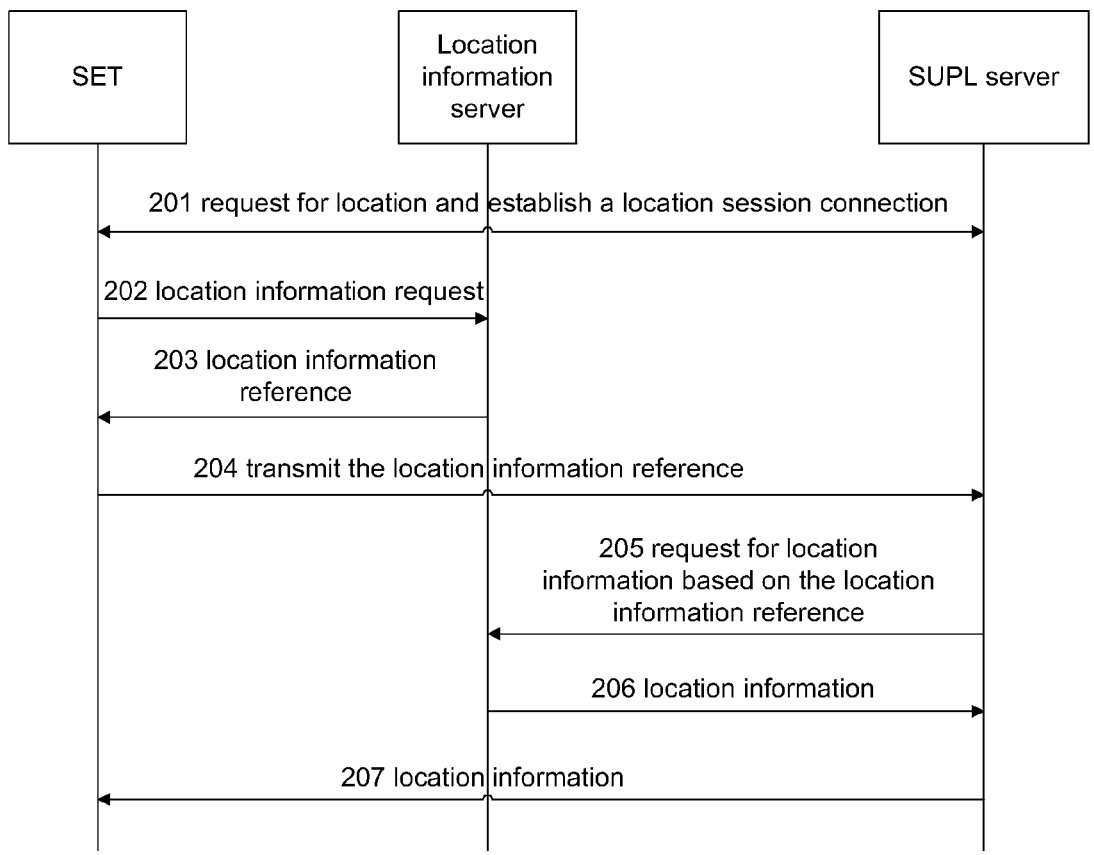
FIG. 2 shows a schematic view of the flow of initiating location by SET according to the disclosure.

FIG. 2 shows a schematic view of the flow of initiating location by SET according to the disclosure. As shown in FIG. 2, when the request for locating the SET is initiated by the SET, i.e. SET Initiated (SI), the specific processes are as followed.

Step 201: a session connection for SUPL location is established between the SET and the SUPL server; the SET initiates the location service.

The SET may notify the SUPL server that the location service to be performed is based on LCP, which may be realized through extending the parameter of an SUPL message, for example, the SUPL server may be notified through an identifier indicating that the service request is a location service based on HELD.

Step 201 is not necessarily sequential in the timing of execution with step 202 and step 203, it may also be executed after step 202, or after step 203.

Step 202: when the SET need to request for the current location information, i.e. the location that the SET is currently located, the SET transmits a location information request to a discovered location information server.

The SET may use the existing discovering mechanism defined by IETF to discover the location information server.

In the GEOPRIV standard of IETF, the location information in the location information request may be divided into four types: any, geographic coordinate, civil address and location information URI. In the specific embodiment converging LCP and SUPL according to the disclosure, the type of location information in the location information request should be location information URI, i.e. location information reference.

It needs to be noted that the location information directly obtained from the location information server may not meet the application demands; therefore, in specific embodiments of the disclosure, the SET requests from the location information server for a location information reference, i.e. a location information URI, but not a character string of the location information, such as geographic coordinate, civil address, etc. The location information URI is an URI address routable globally.

Step 203: after receiving the location information request, the location information server returns a location information response to the SET, which contains a location information reference or a location information reference list.

According to the type of the location information in the location information request, i.e. the reference manner of the location information, one or multiple globally routable location information URIs may be returned through the location information response. When returning multiple location information URIs, the SET may be provided with the location information URIs through returning multiple location information responses; or the SET may be provided with a location information URI list through returning one location information response.

Step 204: after receiving the location information response, the SET obtains the location information reference or the location information reference list therein, and transmits the location information reference or the location information reference list to the SUPL server. The SET may also store or cache the obtained location information reference or location information reference list locally, for future use by the SET directly.

The SET obtains the location information URI or location information URI list from the location information server, and may transmit the location information URI or the location information URI list to the SUPL server via an extended SUPL message through the session connection for SURL location established with the SUPL server.

In the scheme of the disclosure, the existing SUPL message may be extended to enable the location information reference or location information reference list to be transmitted from the SET to the SUPL server. At least two fields may be added into the SUPL location request message transmitted from the SET to the SUPL server, which are: an identifier indicating that the location service is currently based on LCP, or notifying the SUPL server that the currently performed location service is based on LCP; and the location information reference or location information reference list obtained from the location information server.

Furthermore, one or multiple location information URIs may be transmitted by the location information server in step 203, therefore, the SET may transmit the location information URIs to the SUPL server for once (such as through an location information URI list) or multiple times, preferentially, transmit the location information URI list to the SUPL server for once.

Step 205: after the SUPL server receives the transmitted location information reference, it requests the location server for location information.

After the SUPL server receives the location information reference, the following processes are performed based on the location information URI or the location information URI list transmitted from the SET to the SUPL server: if there is only one location information URI, the SUPL server requests the location information from the location information server based on the one location information URI; if there are multiple location information URIs or a location information URI list, the SUPL server may request location information from the location information server for multiple times, or transmit the location information URIs or the location information URI list to the location information server for once to request for location information.

Step 206: the location information server returns the location information corresponding to the location information reference regarding the SET to the SUPL server, in response to the request of the SUPL server.

If the location information server only receives one location information URI transmitted from the SUPL, the location information server only returns one piece of location information to the SUPL server; if the location information server receives multiple location information URIs or a location information URI list, it returns multiple pieces of location information or the location information list to the SUPL server.

Step 207: after the SUPL server receives the location information, it returns the location information obtained from the location information server to the SET.

In the scheme of the disclosure, the SUPL message may be extended to enable the location information to be transmitted from the SET to the SUPL server. The resulted SUPL location information returned from the SUPL server to the SET may directly include the location information value of the SET, and may also include the following fields: a type of the location information defined by the GEOPRIV of IETF, such as civil address, geographical coordinate or hybrid type, etc.

Correspondingly, if the SET only transmits one location information URI to the SUPL server in step 204, the SUPL server only returns one piece of location information to the SET; if the SET transmits multiple location information URIs such as in a location information URI list to the SUPL server, the SUPL server returns multiple pieces of location information such as in a location information list to the SET, or the SUPL server determines an optimal location information value among the multiple pieces of location information, and then transmits the optimal value to the SET.

The period of validity of the location information reference provided to the SET by the location information server is relatively long, therefore, at the SUPL server side, the latest location information corresponding to the location information reference regarding the SET can be obtained at any time based on the location information reference transmitted from the SET. In this way, the steps 205 to 207 may be cycled at a certain time interval, i.e. a user-defined period of time, based on the location information reference obtained from the location information server, thus realizing periodical triggering location.

Figure 3:
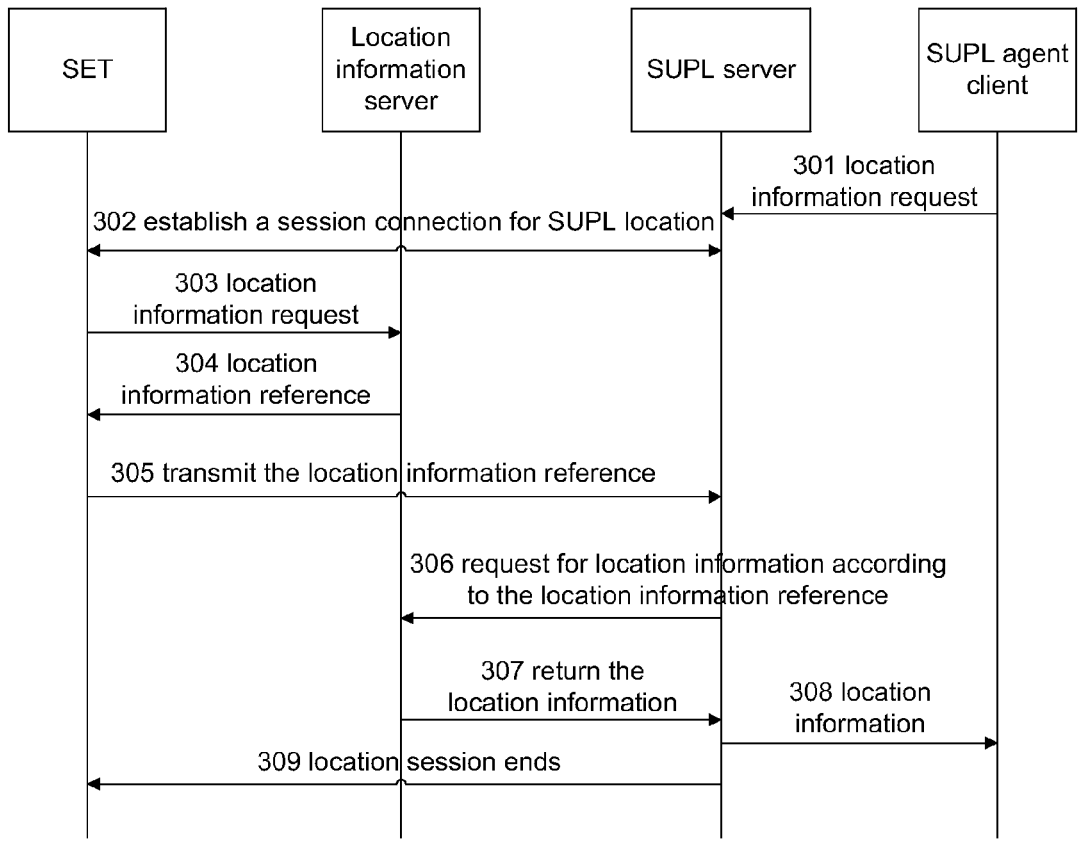
FIG. 3 shows a schematic view of the flow of initiating location by the network side according to the disclosure.

FIG. 3 shows a schematic view of the flow of initiating location by the network side according to the disclosure. As shown in FIG. 3, when the request for locating the SET is initiated by the network side, i.e. Network Initiated (NI), the specific processes are as followed, Step 301: the SUPL agent client at the network side requests for location information regarding the SET from the SUPL server and initiates the request for locating the SET.

Step 302: the session connection for SUPL location is established between the SET and the SUPL server; and the SUPL server performs capability negotiation when the session connection for SUPL location is established between the SET and the SUPL server.

The SUPL server may notify the SET that the SUPL server supports the location service based on IETF LCP, which may be realized through extending the parameter of the SUPL message.

Step 302 is not necessarily sequential in the timing of execution with step 303 and step 304, it may also be executed after step 303, or step 304.

Step 303: the SET transmits a location information request to a discovered location information server.

In the GEOPRIV standard of IETF, the location information in the location information request may be divided into four types: any, geographic coordinate, civil address and location information URI. In the specific embodiment converging LCP and is SUPL according to the disclosure, the type of location information in the location information request should be location information URI, i.e. location information reference. The location information URI is an URI address routable globally.

Step 304: after receiving the location information request, the location information server returns a location information response to the SET, which contains a location information reference or a location information reference list.

According to the type of the location information in the location information request, i.e. the reference manner of the location information, one or multiple globally routable location information URI may be returned through the location information response. When returning multiple location information URIs, the SET may be provided with the location information URIs through returning multiple location information responses; or the SET may be provided with a location information URI list through returning one location information response.

Step 305: after receiving the location information response, the SET obtains the location information reference or the location information reference list therein, and transmits the location information reference or the location information reference list to the SUPL server. The SET may also store or cache the obtained location information reference or location information reference list locally, for future use by the SET directly.

The SET obtains the location information URI or location information URI list from the location information server, and can transmit the location information URI or the location information URI list to the SUPL server via an extended SUPL message through the session connection for SURL location established with the SUPL server.

In the scheme of the disclosure, the existing SUPL message may be extended to enable the location information reference or location information reference list to be transmitted from the SET to the SUPL server. At least two fields may be added into the SUPL location request message transmitted from the SET to the SUPL server, which are: the identifier indicating that the location service is currently based on LCP, or notifying the SUPL server that the currently performed location service is based on LCP; and the location information reference or location information reference list obtained from the location information server.

Furthermore, one or multiple location information URI may be transmitted by the location information server in step 304, therefore, the SET may transmit the location information URIs to the SUPL server for once (such as through an location information URI list) or multiple times, preferentially, transmit the location information URI list to the SUPL server for once.

Step 306: after the SUPL server receives the transmitted location information reference, it requests the location server for location information.

After the SUPL server receives the location information reference, the following processes are performed based on the location information URI or the location information URI list transmitted from the SET to the SUPL server: if there is only one location information URI, the SUPL server requests the location information from the location information server based on the one location information URI; if there are multiple location information URIs or a location information URI list, the SUPL server may request location information from the location information server for multiple times, or transmit the location information URIs or the location information URI list to the location information server for once to request for location information.

Step 307: the location information server returns the location information corresponding to the location information reference regarding the SET to the SUPL server in response to the request of the SUPL server.

If the location information server only receives one location information URI transmitted from the SUPL, the location information server only returns one piece of location information to the SUPL server; if the location information server receives multiple location information URIs or a location information URI list, it returns multiple pieces of location information or a location information list to the SUPL server.

Step 308: after the SUPL server receives the location information, it returns the location information obtained from the location information server to the SUPL agent client at the network side.

Correspondingly, if the SET only transmits one location information URI to the SUPL server in step 305, the SUPL server only returns one piece of location information to the SUPL agent client; if the SET transmits multiple location information URIs such as in a location information URI list to the SUPL server in step 305, the SUPL server returns multiple pieces of location information such as a location information list to the SUPL agent client, or the SUPL server determines an optimal location information value among the multiple pieces of location information, and then transmits the optimal value to the SUPL agent client.

Step 309: the SUPL server transmits a session ending message to the SET, and then the location session flow is ended.

The period of validity of the location information reference provided to the SET by the location information server is relatively long, therefore, at the SUPL server side, the latest location information corresponding to the location information reference regarding the SET can be obtained at any time based on the location information reference transmitted from the SET. In this way, the steps 306 to 308 may be cycled at a certain time interval, i.e. a user-defined period of time, based on the location information reference obtained from the location information server, thus realizing periodical triggering location.

Figure 4:
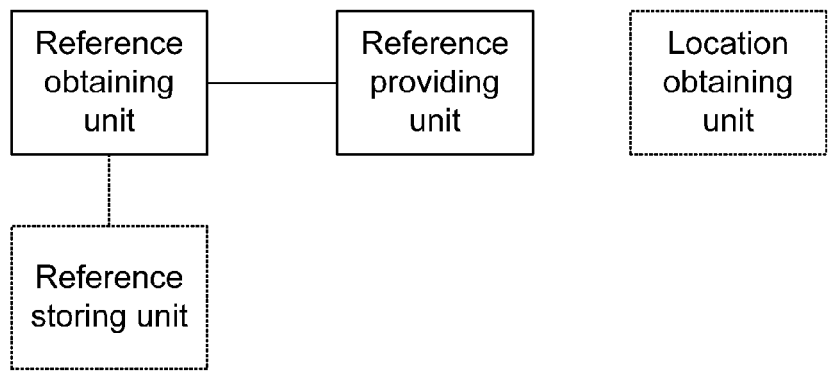
FIG. 4 shows a schematic view of the structure the SET according to the disclosure.
Figure 5:
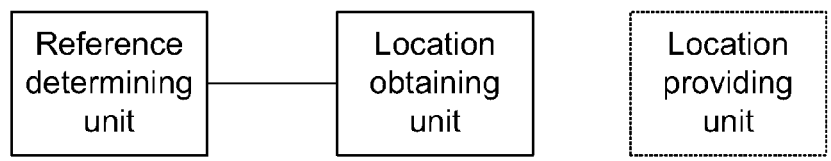
FIG. 5 shows a schematic view of the structure of the SUPL server according to the disclosure.

According to the above description, this disclosure also provides an SET, as shown in FIG. 4, which comprises: a reference obtaining unit and a reference providing unit, wherein the reference obtaining unit obtains the location information reference, specifically by obtaining the location information reference from the location information server or other location servers; the reference providing unit is configured to transmit the location information reference to the SUPL server. Specifically, the reference obtaining unit is configured to transmit a location information request to the location information server, and receiving the location information reference returned by the location information server. The reference providing unit is also configured to establish a session connection for SUPL location with the SUPL server. The SET may further comprise: a reference storing/caching unit, for storing or caching the obtained location information reference, or location information reference list; the location information reference may be directly allocated in the SET, and be stored and cached by the reference storing unit for future use by the SET. The SET may further comprise: a location obtaining module, configured to receive the location information corresponding to the location information reference regarding the SET transmitted by the SUPL server.

The reference obtaining unit is configured to obtain one or multiple location information references, or a location information reference list containing multiple location information references from the location information server. The reference providing unit is configured to transmit one or multiple location information references, or a location information reference list containing multiple location information references to the SUPL server. The location obtaining module is specifically configured to receive one or multiple pieces of location information or a location information list containing multiple pieces of location information, or an optimal location information value determined by the SUPL server among the multiple pieces of location information, returned by the SUPL server.

According to the above description, the SUPL server provided in the disclosure is able to obtain the location information reference regarding the SET through the SUPL message, and further obtain the location information regarding the SET based on the obtained location information reference. Specifically, the location information reference regarding the SET obtained by the SUPL server may be from the SET, and the location information reference regarding the SET is transmitted by the SET via the SUPL message; or the location information reference regarding the SET obtained by the SUPL server may be from the location information server or other location servers, or may be directly allocated in the SUPL server; the location information regarding the SET obtained by the SUPL server may be from the location information server, or from other location servers.

The SUPL server at least comprises: a reference determining unit, configured to obtain the location information reference regarding the SET via the SUPL message. The SUPL server further comprises: a location obtaining unit, configured to obtain the location information regarding the SET based on the location information reference. The SUPL server may further comprise: a location providing unit, configured to provide the SET or SUPL agent client with the location information regarding the SET.

The above descriptions are only preferred embodiments of the disclosure, and do not aimed to limit the protection scope of the disclosure.

The invention claimed is:

1. A location system, comprising:
   a location information server, configured to provide a Secure User Plane for Location Enabled Terminal (SET) with location information regarding the SET in a form of reference according to Location Configuration Protocol (LCP) standard of Internet Engineering Task Force (IETF), and to provide a Secure User Plane for Location (SUPL) server with location information corresponding to the location information reference regarding the SET;
   the SUPL server, configured to obtain the location information regarding the SET from the location information server, based on the location information reference transmitted by the SET;
   wherein the reference includes requesting for a location information Universal reference from the location generator; and
   the location information reference regarding the SET is transmitted from the SET to the SUPL server via an SUPL message according to Secure User Plane for Location (SUPL) standard of Open Mobile Architecture (OMA) Location (LOC) group.

2. The system according to claim 1, wherein the location information server provides the SET with the location information regarding the SET in the form of reference, specifically by: returning, by the location information server, one or multiple location information references, or a location information reference list containing multiple location information references, to the SET.

3. The system according to claim 2, the location system further comprising: the SET, configured to obtain the location information reference regarding the SET from the location information server or/and to use an existing location information reference, and to transmit the location information reference to the SUPL server.

4. The system according to claim 3, wherein the SET transmits the location information reference to the SUPL server, specifically by: transmitting, by the SET, the one or multiple location information references, or the location information reference list containing the multiple location information references to the SUPL server.

5. The system according to claim 3, wherein the SUPL server obtains the location information regarding the SET from the location information server, specifically by:
   requesting, by the SUPL server, the location information from the location information server based on one location information reference, if the SUPL server only receives the one location information reference;
   transmitting, by the SUPL server, multiple location information references to the location information server in batches, or transmitting the location information reference list to the location information server for once, if the SUPL server receives the multiple location information references or the location information reference list containing the multiple location information references.

6. The system according to claim 5, wherein
   the SUPL server is further configured to return one piece of location information to the SET or to an SUPL agent client, if the SUPL server only receives the one location information reference;
   the SUPL server is further configured to return multiple pieces of location information or a location information list containing multiple pieces of location information, or an optimal location information value determined by the SUPL server among the multiple pieces of location information, to the SET or to the SUPL agent client, if the SUPL server receives the multiple location information references or the location information reference list containing the multiple location information references.

7. A location method, comprising:
   obtaining, by a Secure User Plane for Location (SUPL) server, a location information reference regarding a Secure User Plane for Location Enabled Terminal (SET) via an SUPL message;
   wherein the reference includes requesting for a location information Universal reference from the location generator,
   wherein the obtaining, by the SUPL server, the location information reference regarding the SET via the SUPL message comprises: providing, by a location information server, the SET with the location information regarding the SET in a form of reference according to Location Configuration Protocol (LCP) standard of Internet Engineering Task Force (IETF), and providing, by the SET, the SUPL server with the location information reference via the SUPL message according to Secure User Plane for Location (SUPL) standard of Open Mobile Architecture (OMA) Location (LOC) group.

8. The method according to claim 7, further comprising:
   obtaining location information regarding the SET based on the obtained location information reference after the location information reference is obtained.

9. The method according to claim 8, further comprising:
   providing, by the SUPL server, the SET or an SUPL agent client with the location information after the location information is obtained.

10. The method according to claim 8, wherein
    obtaining location information corresponding to the location information reference regarding the SET based on the location information reference comprises: obtaining, by the SUPL server, the location information corresponding to the location information reference regarding the SET from the location information server, based on the location information reference transmitted by the SET.

11. The method according to claim 7, wherein providing, by the location information server, the SET with the location information regarding the SET in a form of reference comprises: returning, by the location information server, one or multiple location information references, or a location information reference list containing multiple location information references, to the SET.

12. The method according to claim 11, further comprising:
    obtaining, by the SET, the location information reference from the location information server, and transmitting, by the SET, the location information reference to the SUPL server, before the location information regarding the SET is obtained.

13. The method according to claim 12, wherein transmitting, by the SET, the location information reference to the SUPL server comprises: transmitting, by the SET, the one or multiple location information references, or the location information reference list containing multiple location information references, to the SUPL server.

14. The method according to claim 12, wherein obtaining, by the SUPL server, the location information regarding the SET from the location information server comprises:
    requesting, by the SUPL server, the location information from the location information server based on one location information reference, if the SUPL server only receives the one location information reference;
    transmitting, by the SUPL server, multiple location information references to the location information server in batches, or transmitting the location information reference list to the location information server for once, if the SUPL server receives the multiple location information references or the location information reference list containing the multiple location information references.

15. The method according to claim 14, further comprising:
    returning, by the SUPL server, one piece of location information to the SET or to the SUPL agent client, if the SUPL server only receives the one location information reference;
    returning, by the SUPL server, multiple pieces of location information or a location information list containing multiple pieces of location information, or an optimal location information value determined by the SUPL server among the multiple pieces of location information, to the SET or to the SUPL agent client, if the SUPL server receives the multiple location information references or the location information reference list containing the multiple location information references.

16. The method according to claim 10, wherein obtaining, by the SUPL server, the location information regarding the SET from the location information server, based on the location information reference comprises: obtaining, by the SUPL server, the location information regarding the SET from the location information server based on the location information reference for once or at predetermined intervals.

17. A location server, comprising: a reference determining unit, configured to obtain a location information reference regarding a Secure User Plane for Location Enabled Terminal (SET) via a Secure User Plane for Location (SUPL) message according to Secure User Plane for Location (SUPL) standard of Open Mobile Architecture (OMA) Location (LOC) group;
    wherein the reference includes requesting for a location information Universal reference from the location generator,
    the location information reference regarding the SET is provided by a location information server according to Location Configuration Protocol (LCP) standard of Internet Engineering Task Force (IETF).

18. The server according to claim 17, wherein the location server further comprises: a location obtaining unit, configured to obtain location information regarding the SET based on the location information reference.

19. The server according to claim 18, wherein the location server further comprises: a location providing unit, configured to provide the SET or an SUPL agent client with the location information regarding to the SET.

20. A location terminal, comprising:
    a reference obtaining unit, configured to obtain a location information reference from a location information server according to Location Configuration Protocol (LCP) standard of Internet Engineering Task Force (IETF); and/or a reference storing unit, configured to store or cache the location information reference;
    a reference providing unit, configured to transmit the location information reference to a Secure User Plane for Location (SUPL) server via a SUPL message according to Secure User Plane for Location (SUPL) standard of Open Mobile Architecture (OMA) Location (LOC) group;
    wherein the reference includes requesting for a location information Universal reference from the location generator.

21. The terminal according to claim 20, wherein
    the reference obtaining unit is specifically configured to obtain one or multiple location information references, or a location information reference list containing multiple location information references, from a location information server; and/or,
    the reference storing unit is specifically configured to store or cache the one or multiple location information references, or the location information reference list containing the multiple location information references.

22. The terminal according to claim 20, wherein the reference providing unit is specifically configured to transmit one or multiple location information references, or a location information reference list containing multiple location information references to the SUPL server via the SUPL message.

23. The terminal according to claim 20, further comprising: a location obtaining module, configured to receive location information regarding a Secure User Plane for Location Enabled Terminal (SET) transmitted from the SUPL server.

24. The terminal according to claim 23, wherein the location obtaining module is specifically configured to receive one or multiple pieces of location information or a location information list containing multiple pieces of location information, or an optimal location information value determined by the SUPL server among the multiple pieces of location information returned by the SUPL server.

25. The method according to claim 11, wherein obtaining, by the SUPL server, the location information regarding the SET from the location information server, based on the location information reference comprises: obtaining, by the SUPL server, the location information regarding the SET from the location information server based on the location information reference for once or at predetermined intervals.

26. The method according to claim 12, wherein obtaining, by the SUPL server, the location information regarding the SET from the location information server, based on the location information reference comprises: obtaining, by the SUPL server, the location information regarding the SET from the location information server based on the location information reference for once or at predetermined intervals.

27. The method according to claim 13, wherein obtaining, by the SUPL server, the location information regarding the SET from the location information server, based on the location information reference comprises: obtaining, by the SUPL server, the location information regarding the SET from the location information server based on the location information reference for once or at predetermined intervals.

28. The method according to claim 14, wherein obtaining, by the SUPL server, the location information regarding the SET from the location information server, based on the location information reference comprises: obtaining, by the SUPL server, the location information regarding the SET from the location information server based on the location information reference for once or at predetermined intervals.

29. The method according to claim 15, wherein obtaining, by the SUPL server, the location information regarding the SET from the location information server, based on the location information reference comprises: obtaining, by the SUPL server, the location information regarding the SET from the location information server based on the location information reference for once or at predetermined intervals.

30. The terminal according to claim 21, further comprising: a location obtaining module, configured to receive location information regarding a Secure User Plane for Location Enabled Terminal (SET) transmitted from the SUPL server.

31. The terminal according to claim 22, further comprising: a location obtaining module, configured to receive location information regarding a Secure User Plane for Location Enabled Terminal (SET) transmitted from the SUPL server.

32. The terminal according to claim 30, wherein the location obtaining module is specifically configured to receive one or multiple pieces of location information or a location information list containing multiple pieces of location information, or an optimal location information value determined by the SUPL server among the multiple pieces of location information returned by the SUPL server.

33. The terminal according to claim 31, wherein the location obtaining module is specifically configured to receive one or multiple pieces of location information or a location information list containing multiple pieces of location information, or an optimal location information value determined by the SUPL server among the multiple pieces of location information returned by the SUPL server.

* * * * *